United States Patent [19]
Carroll

[11] Patent Number: 5,485,809
[45] Date of Patent: Jan. 23, 1996

[54] CHEWABLE ANIMAL TOY

[75] Inventor: Francis C. Carroll, Philadelphia, Pa.

[73] Assignee: EPP, Inc., Philadelphia, Pa.

[21] Appl. No.: 239,114

[22] Filed: May 6, 1994

[51] Int. Cl.$^6$ ..................................................... A01K 29/00
[52] U.S. Cl. ................................................................ 119/710
[58] Field of Search ..................................... 119/709, 710

[56] References Cited

U.S. PATENT DOCUMENTS

| | | | |
|---|---|---|---|
| 5,033,410 | 7/1991 | Sigurdsson | 119/710 |
| 5,174,243 | 12/1992 | O'Rourke | 119/709 |
| 5,231,133 | 7/1993 | Hirasawa et al. | 525/113 |
| 5,298,571 | 3/1994 | Statz et al. | 525/330.2 |

Primary Examiner—Robert P. Swiatek
Attorney, Agent, or Firm—Paul Maleson

[57] ABSTRACT

A chewable animal toy comprising principally an ethylene/methacrylic acid copolymer, ionically cross-linked ionomer resin. The metal component in this polymer is sodium. The hardness of the toy on a "D" scale is 65–99 with a preferred range of 75–85. A starch-based flavoring additive is dispersed throughout the body of the animal toy. In the process of making the animal toy, the flavoring additive is dry mixed with pellets of the ionomer resin before melting and die injection molding the toy. The product is an ingestion safe toy that resists puncturing, cracking, splintering, or shattering, but shaves off to provide a roughening and bristling finish which is desirable for the satisfaction and hygiene of the animal.

19 Claims, No Drawings

CHEWABLE ANIMAL TOY

BACKGROUND OF THE INVENTION

1. Field of the Invention

This invention relates to chewable animal toys. More particularly, its primary field of application is in artificial bones for dogs or other animals. It is independent of the exact configuration or size of the animal toy.

2. Prior Art

Chewable animal toys, including artificial bones for dogs, have been made of many materials and in many configurations and sizes in many previous expedients. Many include compressed natural or food materials with a binding agent. A number of earlier patents involve the use of synthetic polymers. For example, U.S. Pat. No. 4,681,758 discloses a mix of protein and a polymer. U.S. Pat. No. 3,871,334 discloses a toy made of nylon. U.S. Pat. Nos. 4,557,219 and 4,513,014 disclose such toys made of polyurethane. These earlier patents thus differ from a critical aspect of the present invention, and they also differ in other respects, such as their method and means of flavoring.

SUMMARY OF THE INVENTION

This invention relates to a chewable animal toy, particularly, by example, an artificial dog bone. It is a particular and critical aspect of the invention that it be made of a particular ionomer resin having certain characteristics as described. The result is a dog bone that provides a highly desirable reaction to being chewed on by a dog.

The dog bone or other animal toy shaves away without puncturing, cracking, splintering or shattering, and without being so resistant to the animal's teeth as not to provide any satisfaction to the animal. The action of the animal chewing on the bone or other toy produces a roughening and bristling of the surface. This has the effect of providing a scouring and cleaning effect on the teeth of the animal, which is a highly desirable attribute.

Another aspect of the invention is the dispersing of a flavoring material uniformly throughout the body of the toy so that it always remains even after the toy has been greatly used.

Another aspect of the invention relates to the process of making a chewable animal toy including the characteristic of having the flavoring material dry mixed with the ionomer resin before melt and molding.

The major material of the animal toy is an ethylene/methacrylic acid copolymer, ionically cross-linked ionomer resin, made and sold and available from DuPont Company under its trademark Surlyn. The preferred grade of Surlyn is 8240. The ionomer resin is also available from Exxon Chemical Co. under the trademark "Iotex" and from other sources.

It is an object of this invention to provide a chewable animal toy and the method of making the same.

DESCRIPTION OF THE PREFERRED EMBODIMENTS

A chewable animal toy under this invention is particularly exemplified by an artificial dog bone. Such an animal toy has several advantages over previously known such toys, which have been conventionally made of materials such as Nylon or Polyurethane. Its method of manufacture also differs from previously known expedients.

A particular characteristic of a dog bone (for example) made according to the present invention is that as the dog gnaws on it, the material shaves off. The bone becomes rougher and bristly. This characteristic is good for the care of the teeth of the dog. It cleans and scours them. This is a characteristic that is not found in previous expedients.

An animal toy made according to the present invention is lighter in weight than one made of Nylon. It does not splinter or puncture or crack. In these characteristics, it differs from previously known expedients.

Furthermore, the flavor in a dog bone made according to the present invention is disbursed or loaded all the way through the chewable synthetic toy. Thus, even as the toy is slowly chewed away, the attractive flavor remains to the dog. This differs from prior expedients in which the flavor is superficial or only partly integrated into the body of the toy.

An important characteristic of the present invention is that the chewable toy is primarily of a synthetic plastic material made, marketed by, and available from DuPont Company, Wilmington, made, marketed by, and available from DuPont Company, Wilmington, Del., under the DuPont trademark Surlyn. This is an Ethylene/Methacrylic Acid Copolymer, ionically cross-linked ionomer resin. It has a structural formula as follows:

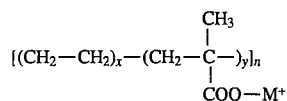

In the above formulation, $M^+$ is sodium. Surlyn also exists in which $M+$ is zinc or potassium, but the sodium type, which has the best clearance for food use, is preferable.

In the present invention, it has been found that a particular grade of the commercially available Surlyn is preferred, with the particular preferable characteristic relating to hardness. There is a usable hardness range and a preferred hardness range.

The ionomer Surlyn has been known to be used for ski boots, cosmetic packaging, athletic shoe soles, automotive exterior trim including rub strips and bumper guards, food packaging and golf ball covers and other golf related devices such as the ball/arm on a golf training device. These applications are related to toughness, durability, appearance and so on, and have not in the slightest suggested the utility of the material for chewable animal toys, which requires a different set of characteristics.

The usable range of hardness on a "D" scale is from 65 to 99. The preferred range of such hardness is 75 to 85 on the "D" scale.

There are about 125 grades or formulations of this ionomer resin available from DuPont Company. It has been found by the present inventor that Surlyn grade 8240 has the most preferable hardness for the present invention. In addition to the ionomer resin, there are two other active components in the present invention. One of the components is flavor and the other is color. The ionomer resin alone is largely translucent and colorless. For use as an animal toy, particularly as a dog bone, a color is added to increase verisimilitude, generally a brown color.

Another important characteristic is the addition of flavoring material, because this flavoring material and its aroma, make the toy particularly attractive to the animal. Such flavoring may include chocolate, peanut butter or beef flavors.

A particularly suitable flavoring material is a spray dried mixed natural and artificial starch-based chocolate flavor available from Henry H. Ottens Manufacturing Company, Philadelphia, Pa. It has a brown color, which is desirable. It has a pH (10% in distilled water) of 5.09±0.50, and is water dispersible. It is approved for use by the FDA. It consists primarily of dextrin, modified food starch, gum arabic, propylene glycol, and vegetable oil. It is available as a powder and a desirable flavor is available under the commercial designation Ottens Flavors S-398-A.

The manufacturing process resulting in the finished chewable animal toy differs from previously known processes. The ionomer resin as described is provided in the form of pellets. It is dry mixed with the dry powder flavor as described. It has been found that about 1% by weight of flavoring material to ionomer is preferable.

With use of the preferred Ottens starch-based flavoring material, the appropriate coloring is including as part of the flavoring material itself. It is understood that if other flavor compositions or mixtures are used, the addition of separate known ingestion-safe coloring materials may be required.

The dry mixture of ionomer resin and flavoring is heated to about 350° F., at which point the ionomer resin melts and mixing takes place so that the flavoring is disbursed throughout. At this temperature, the ionomer resin is flowable and die injectable, and the flavoring material has not been destroyed.

The die is preferably chilled, preferably to about 32° fahrenheit, and is filled through the use of conventional die injection machinery. The molded product is then ejected into ice water for further cooling. It has been found that this process does not form a skin on the molded toy and that the whole bone becomes properly solidified.

Other starch-based flavors may be used. The exact proportion of flavoring material to ionomer is not critical, although approximately a 1% mixture, as described, has been found satisfactory and preferable.

If the final product is too soft, a dog can too easily rip it apart and shred it. If the final toy is too hard, the dog is frustrated by not being able to bite into it at all, or it may tend to crack, shatter, or splinter. Such physical characteristics are highly undesirable in an animal chewable toy because the animal may be injured thereby.

As stated, when the preferred and useful ranges of hardness are provided in the finished toy, and the animal chews on it, a highly desirable and hitherto unavailable characteristic of a shaving action producing a roughening and bristling effect is produced, thus helping maintain the animal teeth by cleaning and scouring.

Since the animal toy is designed to be slowly shaved and roughened by the dog or other animal chewing on it, it is important that the material used for the toy not be toxic. The present ionomer resin of this invention meets this requirement. The present resin uses the sodium form of Surlyn, and injestion tests have demonstrated that there was no pathologic changes found in standard feeding tests with rats and dogs. The material is not listed by IRAC, NTP, OSHA, or ACGIH as a carcinogen. The grade of Surlyn used in this invention complies with the provisions of 21 CFR 177.1330-ionomeric resins. This specifies that the material may be safely used as articles intended for use in contact with food.

The die injection molding process used in the present invention is similar to the recommended or conventional processes for Surlyn, with some exceptions. Generally, it is conventional to heat ionomer resins of this type to be between 410°–500° F. for injection molding. In the present invention's process, the temperature is approximately 350°. This is satisfactory for the molding process, and it avoids damaging the flavor component which is pre-mixed before melting and molding. Another departure from conventional molding techniques lies in the temperature of the mold. Generally, conventionally, the mold is maintained between 40°–120° F. It has been found that for the present invention, a mold chilled to approximately 32° F. is preferable.

The injection pressures of between 10–12,000 psi, at fill rate of 5 to 8 seconds, and a back pressure of 50–200 psi are all conventional.

In the following examples, the conditions described above all apply except where a different condition is specified.

EXAMPLE 1

An animal toy in the shape of a dog bone was made using the parameters as described above with an ionomer resin as described above having a hardness on the "D" scale of about 60. It was found that the resulting product was softer than desirable; it was shredded and chewed apart by a dog sooner than acceptable.

EXAMPLE 2

An animal toy in the shape of a dog bone was made using the parameters as described above with an ionomer resin as described above having a hardness on the "D" scale of about 65. It was found that the slight increase in hardness produced a dog bone that was marginally hard enough when chewed by a dog.

EXAMPLE 3

An animal toy in the shape of a dog bone was made using the parameters as described above with an ionomer resin as described above having a hardness on the "D" scale of about 75. It was found that the result when a dog chewed on the bone was good, as that characteristic has been described elsewhere in this specification.

EXAMPLE 4

An animal toy in the shape of a dog bone was made using the parameters as described above with an ionomer resin as described above having a Surlyn of the DuPont grade 8240 was used, with a hardness on the "D" scale of about 80. It was found that this was the very best degree of hardness in achieving the desired results for a dog bone.

EXAMPLE 5

An animal toy in the shape of a dog bone was made using the parameters as described above with an ionomer resin as described above having a hardness on the "D" scale of about 85. It was found that the result when a dog chewed on the bone was good, as that characteristic has been described elsewhere in this specification.

EXAMPLE 6

An animal toy in the shape of a dog bone was made using the parameters as described above with an ionomer resin as described above with a hardness on the "D" scale of just under 100. It was found that the slight increase in hardness produced a dog bone that was marginally not too hard when chewed by a dog.

EXAMPLE 7

An animal toy in the shape of a dog bone was made using the parameters as described above with an ionomer resin as described above with a hardness on the "D" scale of just over 100. It was found that this bone was frustrating to the dog because it was too hard for the dog to shave or scrape or roughen the surface so as to attain satisfaction of the dog's chewing instincts, and it also failed to produce the scrubbing or scouring effect valuable to maintenance of the dog's teeth.

A number of trials were run with the preferred 8240 grade ionomer resin using different ratios of the preferred flavoring additive having the specifications as described elsewhere in this specification.

EXAMPLE 8

An animal toy in the shape of a dog bone was made using the parameters as described above with an ionomer resin as described above with a hardness on the "D" scale of about 80. To 15 pounds of ionomer resin pellets was added about one ounce (about 0.4%) of a starch-based flavoring as described elsewhere in the specification. It was found that this was just barely a minimum amount of flavoring to produce an acceptable dog bone.

EXAMPLE 9

An animal toy in the shape of a dog bone was made using the parameters as described above with an ionomer resin as described above with a hardness on the "D" scale of about 80. To 15 pounds of ionomer resin pellets were added about one and a half ounces of a starch-based flavoring as described elsewhere in the specification. It was found that this produced an acceptable amount of flavor.

EXAMPLE 10

An animal toy in the shape of a dog bone was made using the parameters as described above with an ionomer resin as described above with a hardness on the "D" scale of about 80. To 15 pounds of ionomer resin pellets was added about two ounces of a starch-based flavoring as described elsewhere in the specification. It was found that this produced an acceptable amount of flavor substantially indistinguishable from the previous example.

EXAMPLE 11

An animal toy in the shape of a dog bone was made using the parameters as described above with an ionomer resin as described above with a hardness on the "D" scale of about 80. To 15 pounds of ionomer resin pellets were added about two and a half ounces of a starch-based flavoring as described elsewhere in the specification. It was found that this produced an acceptable product, but it was felt that this was flavored slightly more than necessary.

EXAMPLE 12

An animal toy in the shape of a dog bone was made using the parameters as described above with an ionomer resin as described above with a hardness on the "D" scale of about 80. To 15 pounds of ionomer resin pellets were added about three ounces (about 1.25%) of a starch-based flavoring as described elsewhere in the specification. It was found that this produced an acceptable product, but it was felt that this was flavored slightly more than necessary.

EXAMPLE 13

An animal toy in the shape of a dog bone was made using the parameters as described above with an ionomer resin as described above with hardness on the "D" scale of about 80. To 15 pounds of ionomer resin pellets were added about three and a half ounces of a starch-based flavoring as described elsewhere in the specification. It was found that this produced a flavoring stronger than necessary and was an uneconomical use of the flavoring material.

It is understood that in each of the preceding representing examples of tests, the particular starch-based flavoring additive contained enough coloring matter to make the bone attractive and acceptable.

It is noted that with the particular hardness protocol used, the Surlyn grade 8240 produced a hardness of approximately 80. It is understood that various testing methods, such as ASTM testing methods and the ISO testing method, produce different numerical results.

I claim:

1. A chewable animal toy comprised of a single ethylene/methacrylic acid copolymer, ionically cross-linked ionomer resin having a hardness such that when chewed by an intended animal, the toy does not puncture, splinter, shatter, or crack, or prevent biting into said resin but instead shaves off and roughens and bristles whereby the animal is satisfied with the gnawing action and the animal's teeth are scoured and cleaned.

2. An animal toy as set forth in claim 1 wherein said animal toy has a hardness on the "D" scale from 65–99.

3. An animal toy as set forth in claim 2 wherein said animal toy has a hardness on the "D" scale between 75–85.

4. An animal toy comprised of an ethylene/methacrylic acid copolymer, ionically cross-linked ionomer resin having a hardness such that when chewed by an intended the animal, the toy does not puncture, splinter, shatter, or crack prevent biting into said resin but instead shaves off and roughens and bristles whereby the animal is satisfied with the gnawing action and the animal's teeth are scoured and cleaned and a starch-based flavoring additive dispersed throughout the entire body of said toy.

5. An animal toy as set forth in claim 4 wherein said starch-based flavor additive comprises between 0.4%–1.25% by weight of the said ionomer resin.

6. An animal toy as set forth in claim 1 wherein said ionomer resin has the formula:

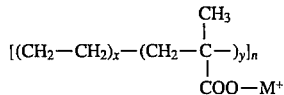

where $M^+$ is sodium.

7. An animal toy as set forth in claim 6 wherein the hardness of said toy is 65–99 on the "D" scale.

8. An animal toy as set forth in claim 7 wherein the hardness of said animal toy is between 75–85 on the "D" scale.

9. An animal toy as set forth in claim 8 wherein the said ionomer resin is Surlyn grade 8240.

10. An animal toy as set forth in claim 1 wherein said animal toy is an artificial chewable dog bone.

11. An animal toy in the form of a dog bone, comprising an ethylene/methacrylic acid copolymer, ionically cross-linked, ionomer resin having the general formula:

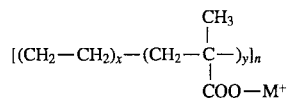

where M⁺ is sodium and wherein the hardness is between 75–85 on the "D" scale, and also comprising 0.4%–1.25% of a spray dried starch-based artificial and natural flavor comprising dextrin, modified food starch, gum arabic, propylene glycol and vegetable oil.

12. The method of making a chewable animal toy, comprising dry-mixing pellets of ethylene/methacrylic acid copolymer, ionically cross-linked, ionomer resin, with approximately 0.4%–1.25% of a starch-based flavoring additive, melting to a temperature of approximately 350° F., extruding into a chilled die-injection mold, and expressing said molded toy into ice water.

13. A method as set forth in claim 12 wherein said pellets are Surlyn grade 8240 ionomer resin equivalent.

14. A method as set forth in claim 12 wherein said mold is chilled to approximately 32° F.

15. A method as set forth in claim 12 wherein said flavoring additive comprises spray dried dextrin, modified food starch, gum arabic, propylene glycol, and vegetable oil.

16. A method as set forth in claim 12 wherein said animal toy is in the shape of a chewable dog bone and has a hardness between 65–99 on the "D" scale.

17. A method as set forth in claim 16 wherein said ionomer resin has the general formula

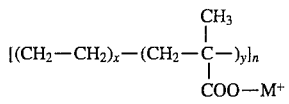

where M⁺ is sodium.

18. A method as set forth in claim 17 wherein said animal toy has a hardness equivalent to Surlyn 8240.

19. The use as a chewable animal toy of a molded bone, comprising only a single ethylene/methacrylic acid copolymer, ionically cross-linked, ionomer resin having the general formula:

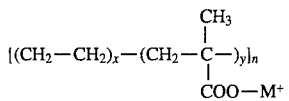

where M⁺ is a metal and wherein the hardness is between 65–100 on the "D" scale, and wherein said hardness is such that when chewed by an intended animal, the toy does not puncture, splinter, shatter, or crack, or prevent biting into said resin but instead shaves off and roughens and bristles whereby the animal is satisfied with the gnawing action and the animal's teeth are scoured and cleaned.

* * * * *